US008243093B2

(12) United States Patent
Feng et al.

(10) Patent No.: US 8,243,093 B2
(45) **Date of Patent: *Aug. 14, 2012**

(54) SYSTEMS AND METHODS FOR DITHER STRUCTURE CREATION AND APPLICATION FOR REDUCING THE VISIBILITY OF CONTOURING ARTIFACTS IN STILL AND VIDEO IMAGES

(75) Inventors: Xiao-Fan Feng, Vancouver, WA (US); Scott J. Daly, Kalama, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 1759 days.

This patent is subject to a terminal disclaimer.

(21) Appl. No.: 10/645,952

(22) Filed: Aug. 22, 2003

(65) Prior Publication Data

US 2005/0185001 A1 Aug. 25, 2005

(51) Int. Cl.
*G09G 5/02* (2006.01)
*H04N 5/00* (2011.01)

(52) U.S. Cl. ............ 345/597; 345/89; 345/97; 345/475; 345/596; 345/598; 345/599; 345/607; 345/624; 345/690; 345/691; 345/693; 345/694; 345/698; 345/102; 345/611; 348/14.14; 348/14.15; 348/33; 348/34; 348/57; 348/270; 348/273; 348/317; 348/342; 348/412.1; 348/415.1; 348/430.1; 348/439.1; 348/456; 348/490; 348/513; 348/574; 348/620; 348/665; 358/1.9; 358/2.1; 358/1.15; 358/3.13; 358/3.14; 358/534; 358/535; 358/463

(58) Field of Classification Search ................. 358/3.13, 358/3.06, 3.14, 534, 535, 1.9, 2.1, 1.15, 3.1, 358/270; 382/271, 272, 273, 277, 201; 345/596–599, 604, 475, 102, 611, 690, 89, 345/97, 607, 624, 693, 694, 698; 348/14.14, 348/14.15, 33, 34, 270, 273, 317, 342, 412.1, 348/415.1, 430.1, 439.1, 456, 513, 574, 620, 348/665; 359/26, 291, 320, 892
See application file for complete search history.

(56) References Cited

U.S. PATENT DOCUMENTS

| | | | |
|---|---|---|---|
| 3,244,808 | A | 4/1966 | Roberts |
| 3,562,420 | A | 2/1971 | Thompson et al. |
| 3,739,082 | A | 6/1973 | Lippel |
| 3,961,134 | A | 6/1976 | Jarvis |
| 4,275,411 | A | 6/1981 | Lippel |
| 4,460,924 | A | 7/1984 | Lippel |
| 4,568,966 | A | 2/1986 | Lippel |

(Continued)

OTHER PUBLICATIONS

L.G. Roberts (1962) "Picture Coding using pseudo-random noise" IRE trans. On Information Theory. Feb 145-154.

(Continued)

*Primary Examiner* — Steven Kau
(74) *Attorney, Agent, or Firm* — Krieger Intellectual Property, Inc.; Scott C. Krieger

(57) ABSTRACT

Aspects of the present invention relate to creation, modification and implementation of dither pattern structures applied to an image to diminish contouring artifacts. Some aspects relate to dither pattern structures with pixel values in a first color channel pattern that are spatially dispersed from pixel values in a corresponding pattern in a second color channel. Some aspects relate to application. Some aspects relate to systems and apparatus for creation and application of these dither pattern structures comprising pixel values dispersed across color channels.

11 Claims, 10 Drawing Sheets

U.S. PATENT DOCUMENTS

| | | | | |
|---|---|---|---|---|
| 4,652,905 | A | 3/1987 | Lippel | |
| 4,683,490 | A * | 7/1987 | Strolle et al. | 348/609 |
| 4,758,893 | A * | 7/1988 | Lippel | 348/472 |
| 4,956,638 | A | 9/1990 | Larky et al. | |
| 4,965,668 | A | 10/1990 | Abt et al. | |
| 5,059,963 | A | 10/1991 | Fukuoka | |
| 5,111,310 | A | 5/1992 | Parker et al. | |
| 5,138,303 | A | 8/1992 | Rupel | |
| 5,148,273 | A | 9/1992 | Lippel | |
| 5,164,717 | A | 11/1992 | Wells et al. | |
| 5,201,030 | A | 4/1993 | Carrie | |
| 5,218,649 | A | 6/1993 | Kundu | |
| 5,227,869 | A | 7/1993 | Degawa | |
| 5,253,045 | A | 10/1993 | Lippel | |
| 5,254,982 | A | 10/1993 | Feigenblatt et al. | |
| 5,333,260 | A | 7/1994 | Ulichney | |
| 5,333,262 | A | 7/1994 | Ulichney | |
| 5,552,800 | A | 9/1996 | Uchikoga et al. | |
| 5,577,590 | A | 11/1996 | Salda | |
| 5,619,228 | A | 4/1997 | Doherty et al. | |
| 5,619,230 | A | 4/1997 | Edgar | |
| 5,623,281 | A | 4/1997 | Markandey et al. | |
| 5,652,624 | A | 7/1997 | Lippel | |
| 5,696,601 | A | 12/1997 | Metcalfe et al. | |
| 5,712,651 | A | 1/1998 | Tomiyasu | |
| 5,712,657 | A | 1/1998 | Eglit et al. | |
| 5,714,974 | A | 2/1998 | Liu | |
| 5,726,718 | A | 3/1998 | Doherty et al. | |
| 5,751,379 | A | 5/1998 | Markandey et al. | |
| 5,766,807 | A * | 6/1998 | Delabastita et al. | 430/6 |
| 5,809,178 | A | 9/1998 | Anderson et al. | |
| 5,969,710 | A | 10/1999 | Doherty et al. | |
| 5,983,251 | A * | 11/1999 | Martens et al. | 708/203 |
| 6,040,876 | A | 3/2000 | Pettitt et al. | |
| 6,052,491 | A | 4/2000 | Clatanoff et al. | |
| 6,084,560 | A | 7/2000 | Miyamoto | |
| 6,091,849 | A * | 7/2000 | Spaulding et al. | 382/162 |
| 6,122,783 | A | 9/2000 | Herndon et al. | |
| 6,147,671 | A | 11/2000 | Agarwal | |
| 6,215,913 | B1 | 4/2001 | Clatanoff et al. | |
| 6,288,698 | B1 | 9/2001 | Ishii et al. | |
| 6,714,206 | B1 * | 3/2004 | Martin et al. | 345/589 |
| 6,795,085 | B1 * | 9/2004 | Doherty et al. | 345/596 |
| 6,851,783 | B1 * | 2/2005 | Gupta et al. | 347/15 |
| 6,920,653 | B2 | 7/2005 | Selover | |
| 7,110,010 | B1 * | 9/2006 | Masuji et al. | 345/692 |
| 7,110,455 | B2 * | 9/2006 | Wu et al. | 375/240.16 |
| 7,256,795 | B2 * | 8/2007 | Chen | 345/597 |
| 2003/0164961 | A1 * | 9/2003 | Daly | 358/1.9 |

OTHER PUBLICATIONS

J. Thompson and J. Sparkes (1967) "A pseudo-random quantizer for television signals", Proceedings of the IEEE, V. 55 #3, 353-355.

R. Ulichney, "Dithering with Blue Noise", Proceedings of the IEEE, vol. 76, No. 1, pp. 56-79, 1988.

T. Mitsa and K. Parker (1991) "Digital Halftoning using a Blue Noise Mask", In SPIE Electronic Imaging Conference, V. 1452, 45-56.

A. Ahumada and A.B. Watson (1985) "Equivalent input noise model for contrast detection and discrimination", JOSA V. 2 #7, 1133-1139.

S. Daly (1990) "Application of a noise-adaptive contrast sensitivity function to image data compression" Optical Engineering V. 29, 977-987.

S. Daly (1993) "Visible Difference Predictor: Algorithm for the assessment of image fidelity", in Human Vision and Digital Images, Ed. By A.B. Watson, MIT Press.

D. Field, A Hayes, and R. hess (1993) "Contour Integration by the human visual system: Evidence for local associations field". Vis. Res. V. 33 #2, 173-193.

T. Pappas and D. Neuhoff (1995) "Printer models and error diffusion", IEEE Trans. On image processing V. 4 #1, 66-80.

J.K. Ijspeert, et al (1993) "An improved mathematical description of the foveal visual point spread function with parameters for age, pupil size, and pigmentation", Vies. Res. V. 33, 15-20.

D.R. Williams (1985) "Visibility of interference fringes near the resolution limit", JOSA AV.2, p. 1091.

J. Mulligan (1993) "Methods for spatiotemporal dithering" SID Conference, pop. 155-158.

D. Kelly and C. Burbeck (1980) Spatiotemporal Characteristics of visual mechanisms: excitatory-inhibitory model. JOSA V. 70, pp. 1121-1126.

* cited by examiner

SYSTEMS AND METHODS FOR DITHER STRUCTURE CREATION AND APPLICATION FOR REDUCING THE VISIBILITY OF CONTOURING ARTIFACTS IN STILL AND VIDEO IMAGES

BACKGROUND

Digital images are communicated by values that represent the luminance and chromatic attributes of an image at an array of locations throughout the image. Each value is represented by a given number of bits. When bandwidth, storage and display requirements are not restrictive, sufficient bits are available that the image can be displayed with virtually uninhibited visual clarity and realistic color reproduction. However, when bit-depth is restricted, the gradations between adjacent luminance or color levels can become perceptible and even annoying to a human observer. This effect is apparent in contouring artifacts visible in images with low bit-depth. Contour lines appear in low frequency areas with slowly varying luminance where pixel values are forced to one side or the other of a coarse gradation step.

These contouring artifacts can be "broken up" by adding noise or other dither patterns to the image, generally before quantization or other bit-depth reduction. This noise or pattern addition forces a random, pseudo-random or other variation in pixel values that reduces the occurrence and visibility of contours. Typically, the image is perceived as more natural and pleasing to a human observer.

Some of these methods can be explained with reference to FIG. 1, which illustrates an image display system 1. In these systems, noise or dither patterns 16 can be added to 4 or otherwise combined with an image 2. The combined image is then quantized 6 to a lower bit-depth. The image may then be displayed directly or, as shown in FIG. 1, may be transmitted 8 to a receiver 10. After reception, the noise/dither 16 that was added to the image may be subtracted 12 or otherwise de-combined with the image to reduce the visible effect of the noise/dither on areas where contouring is not likely to occur. The image is then displayed 14 on the receiving end. These methods may also be used in systems that do not transmit or receive such as with displays with bit-depth capabilities that are lower than the image data 2 to be displayed.

Some of these methods may be explained with reference to FIG. 2. In these systems 20, an image 2 is combined 28 with a noise/dither pattern 16 and sent to a display system 22 that cannot display the full range of image data contained in the image. These display systems 22 may quantize 24 the image data to a bit-depth that matches the display capabilities. The quantized image data is then displayed on the display 26.

In the systems illustrated in FIG. 2, the noise/dither pattern is not subtracted or de-combined from the image. In these systems, less noise can be added to an image before it causes adverse visual impact or "graininess." Various frequency distributions for noise/dither patterns have been found to be more or less visible to the human visual system. Generally, the human visual system works as a low-pass filter that filters out high frequency data. Therefore, noise concentrated in a high-frequency range is less visible than lower frequency noise.

Often it is not feasible to use a dither/noise pattern that is as big as an image file. In these cases, a smaller dither pattern can be used by repeating the pattern across the image in rows and columns. This process is often referred to as tiling. In multiple image sets, such as the frames or fields of video images, a dither pattern may be repeated from frame to frame as well. Dither patterns may be designed to minimize artifacts created by their repetitive patterns.

Dither structures may comprise multiple dither patterns to be used across a single image of multiple frames. A three-dimensional dither structure, as shown in FIG. 3, may employ a series of dither patterns. These patterns 30-36 may be arranged in a sequence that is used on sequential frames of video. A first dither pattern tile 30 may be used on a first video frame 38 while a next sequential pattern 32 is used on a next successive video frame 40. The sequence of patterns 30-36 may be repeated after each pattern in the sequence is used. These sequences may also be specially designed to reduce the occurrence of artifacts from their repetitive temporal patterns.

SUMMARY

Systems and methods of embodiments of the present invention comprise the creation and/or application of dither structures. These structures may be used to reduce the visibility of contouring and other artifacts in still and video images.

BRIEF DESCRIPTION OF THE DRAWINGS

The following drawings depict only typical embodiments of the present invention and are not therefore to be considered to be limiting of its scope, the invention will be described and explained with additional specificity and detail through the use of the accompanying drawings in which.

DETAILED DESCRIPTION

Embodiments of the present invention may be used in conjunction with displays and, in some embodiments, in display algorithms that employ properties of the visual system in their optimization. Some embodiments of the present invention may comprise methods that attempt to prevent the contouring artifacts in displays that have too few gray levels. Some of these displays include LCD or similar displays with a digital bit-depth bottleneck. They may also be used with graphics controller cards with limited video RAM (VRAM).

These bit-depth limitations can arise in the LCD display itself, or its internal hardware driver.

Some embodiments of the present invention include systems and methods comprising an anti-correlated spatio-temporal dither pattern, which exhibits high-pass characteristics in the spatial and temporal domains. Methods for creating these patterns comprise generation of a series of dither tiles for multiple image characteristic channels and the temporal domain.

Figure 4:
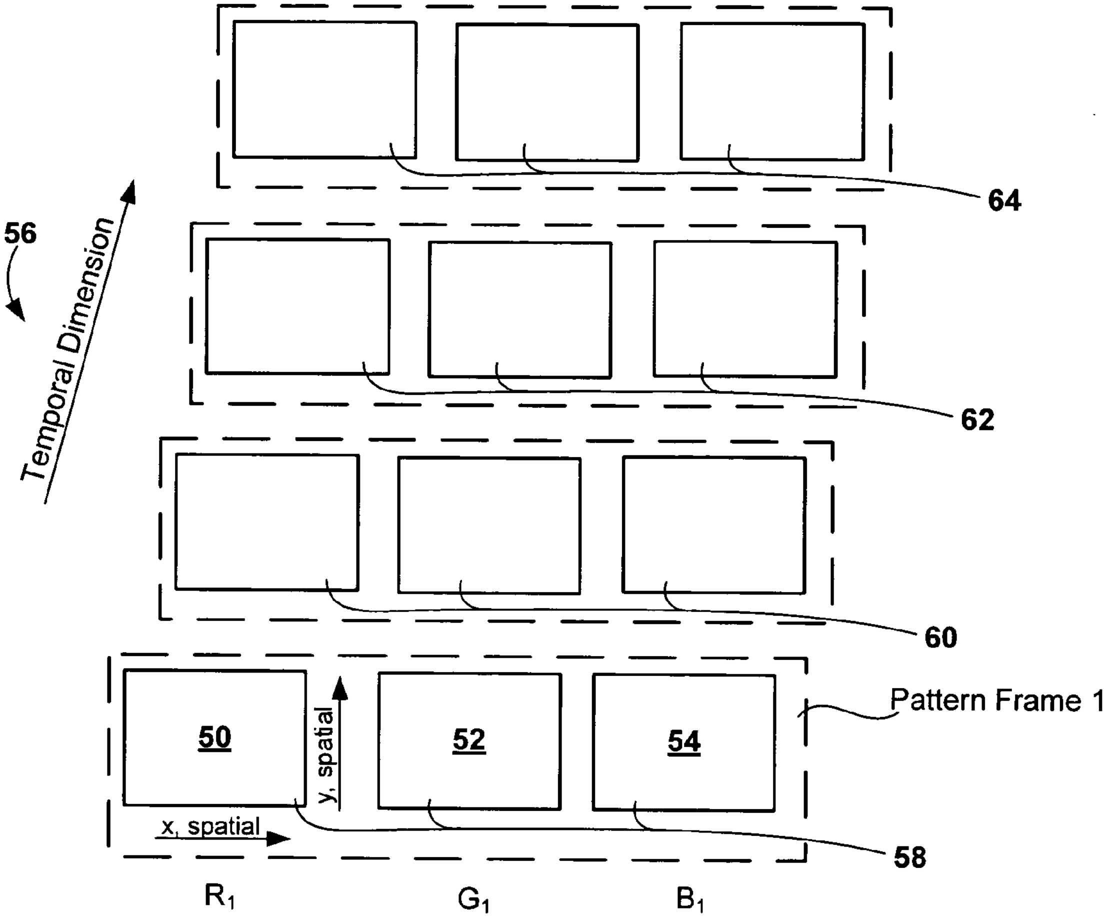
FIG. 4 illustrates a multi-dimensional dither structure with multiple image characteristic channels.

In a non-limiting example, as shown in FIG. 4, a different dither pattern tile 50, 52 & 54 may be generated for each of three RGB color channels and this set of three tiles 58 may be generated for a series of temporal frames 58, 60, 62 & 64. In this example, a multi-dimensional array of tiles is generated. In other embodiments, varying numbers of chrominance and luminance channels may be used and varying patterns may be used in successive frames in the temporal domain also.

Figure 5:
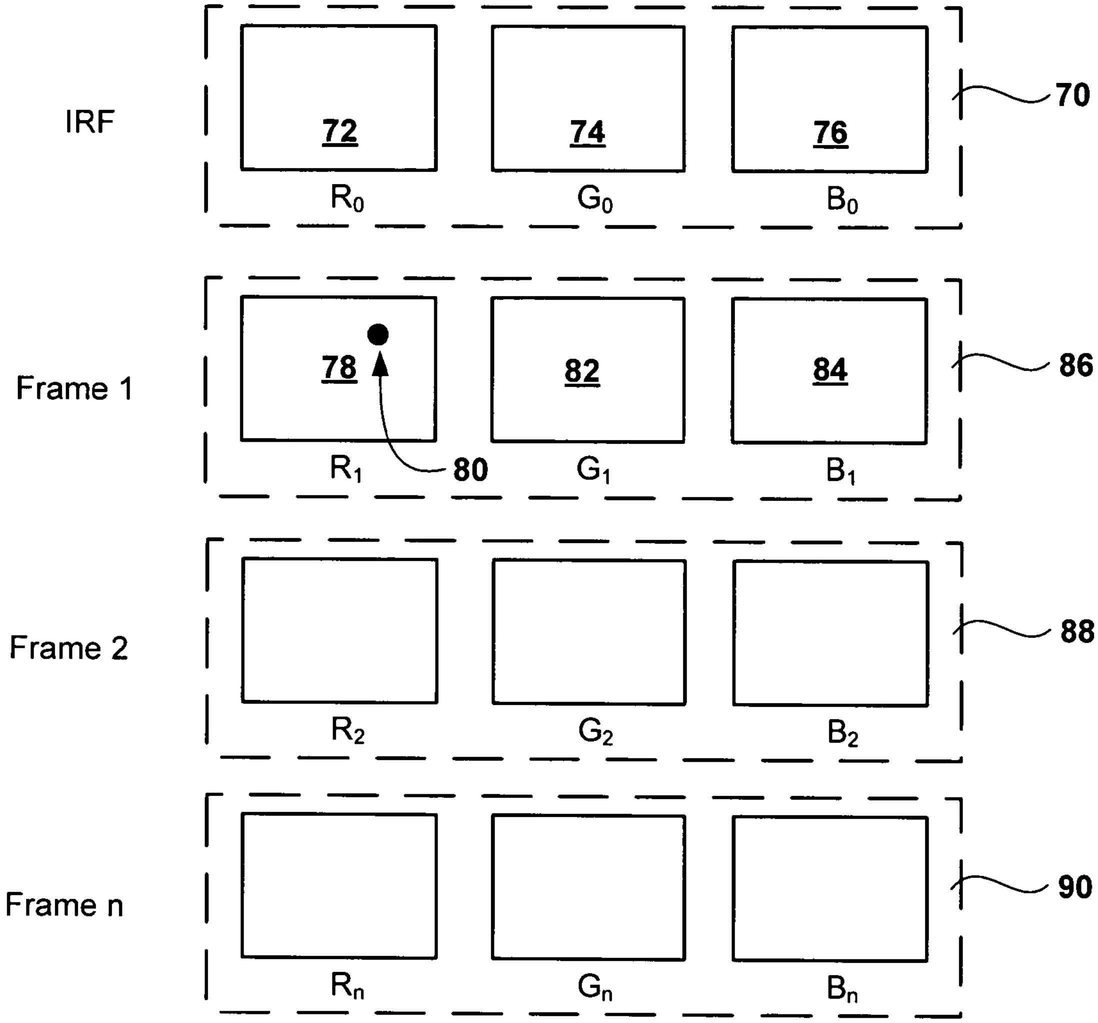
FIG. 5 a multi-dimensional dither structure with multiple image characteristic channels and an Initial Reference Frame comprising multiple dither tiles.

In some embodiments of the present invention, as illustrated in FIG. 5, a set of dither pattern tiles is generated one element at a time by successively designating each pixel value according to an anti-correlation or dispersion method, which may be referred to as a merit function. To initiate the procedure, an initial reference dither pattern or set of initial reference dither patterns 70 may be used.

An initial reference dither pattern 72, 74 & 76 may be a dither tile with a random noise pattern, a pre-set pattern, a constant value across all pixels, a blank tile or some other fixed or random pattern. A set of initial reference dither patterns 72, 74 & 76 for multiple channels of an image, such as the R, G and B channels of an RGB image, forms an initial reference frame 70. Once the initial reference pattern or frame 70 is established, pixel values in the dither pattern tiles can be generated. To ensure that the generated pattern is high-pass, a dispersion-related merit function is used to place each pixel.

In this exemplary method, a first pixel 80 is placed in the red channel tile 78 of frame 1. According to the dispersion merit function, this pixel is placed at a point that is dispersed from the location of pixel values in the initial reference frame tiles 72, 74 & 76. This dispersion merit function can relate to values in same color channel or a combination of color channels. Each color channel tile in the initial reference frame may be weighted to give different channels priority over others.

Once the first pixel has been placed, other pixels can be placed according to the dispersion merit function. These subsequent pixels will be placed in a manner that is dispersed from the first pixel 80 and may also be dispersed from pixel values in the initial reference frame 70. Generally, pixel values in the actual dither pattern 78 being developed will have greater weight than those in the initial reference frame 70, however these weighting factors may vary for specific applications. Each dither pattern tile (i.e., 78) can be completed individually or a set of tiles making up a frame may be generated simultaneously. For example, a pixel may be placed in a red channel tile 78 followed by a pixel placement in a green channel tile 82 of the same frame followed by a pixel placement in the blue channel tile 84 of the same frame. Alternatively, a single color channel tile may be completed before placement of pixel values in another color channel tile of the same frame.

In this manner, each frame's dither pattern tiles are generated with reference to the patterns already established in previous frames and/or the initial reference frame. As the process continues from frame to frame, the weighting of previous frames may vary. For example, the weight given to pixel values in the closest preceding frame may be higher than that given to the next closest preceding frame. In some embodiments the initial reference frame 70 may be used only to generate the first frame 86. In other embodiments the initial reference frame 70 may be referenced in the generation of multiple successive frames with or without weighting factors.

Typically, due to memory constraints, the number of dither pattern frames is much less than the number of frames in a video clip so a series of pattern frames is reused in sequence. This cycle makes the first frame of the sequence 86 immediately follow the last frame 90. Accordingly, if these frames are not correlated, visible artifacts may develop. To avoid this, the last frames in a sequence are generated with reference to the first frame or frames as well as the previous frame or frames. This helps ensure that the pattern is continuously high-pass throughout multiple cycles.

In an exemplary embodiment of the present invention a 32×32 spatial dither pattern tile is generated for each color channel for RGB application. This pattern is created for 32 temporal frames thereby yielding a 32×32×32×3 array. The size is not a factor in the overall function of some embodiments and many different dimensions may be used. A merit function is used to disperse the pixel values into a high-pass relationship. This high-pass relationship may exist spatially within a dither pattern tile, spectrally across color channel tiles and temporally across successive frames. In order to achieve all these relationships, the location of a pattern pixel value must have feedback from other pixel values within the tile pattern, other color channel tiles within the frame and pixel values in adjacent frames. Dispersion or anti-correlation across color channels can help reduce fluctuation in luminance where human vision has the highest sensitivity.

Negative feedback is a way to control the pattern so that pixel values are equally spaced in space and/or time. As a non-limiting example, if a large dither value is assigned to a position A at (i, j, k), its neighbors will be forced to take smaller values because negative influence from the large value at A. The further away from A, the less the influence the value at A will have on another pixel designation.

Figure 6:
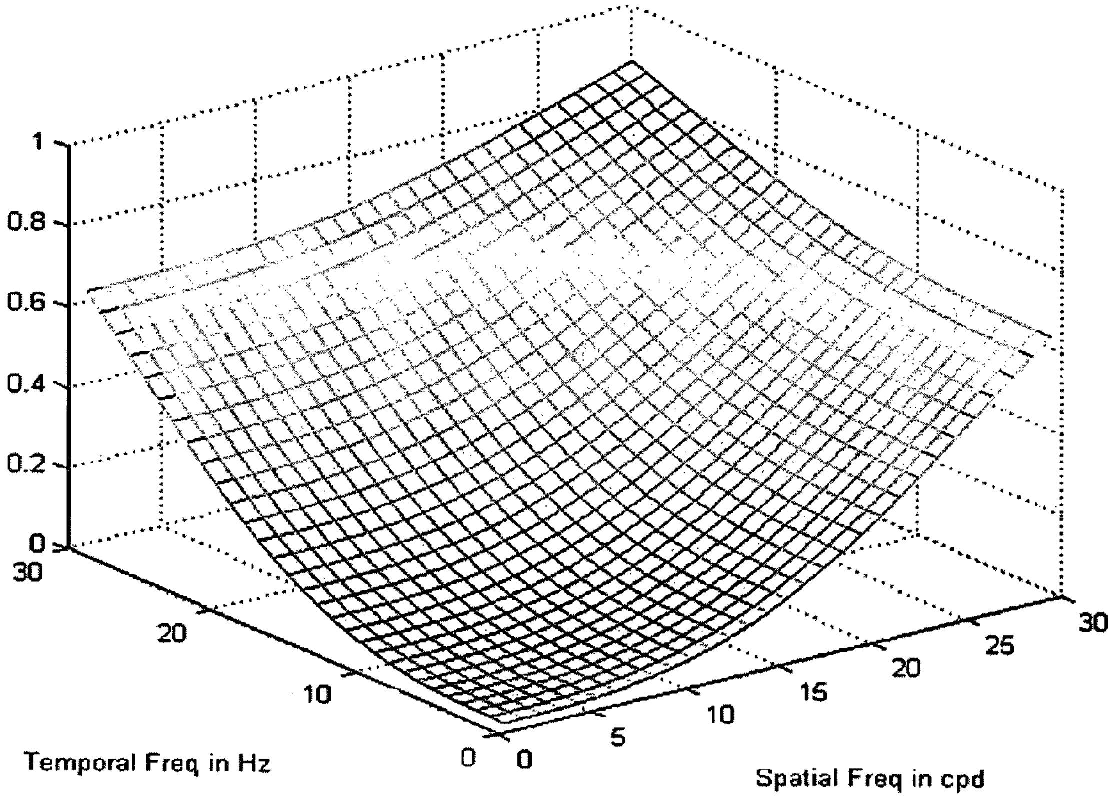
FIG. 6 illustrates a general high-pass spatial and high-pass temporal power spectrum.

FIG. 6 is a diagram showing a mutual high-pass temporal and spatial relationship achieved in some embodiments of the present invention. In order to achieve a high-pass pattern similar to that shown in FIG. 6 a variety of feedback functions and parameters may be used.

To define a dither pattern tile set several parameters must be defined. The spatial size of each tile (i.e., M×N), the number of frames, L and the number of color channels must be designated. Each parameter has trade offs that must be balanced. However, embodiments of the present invention allow less resource intensive parameters to be used without perceptible degradation of the final image. The number of levels in the dither pattern set must also be determined. A level may correspond to a luminance value, such as a gray-scale value in a monochrome image, a value for the luminance channel in image formats with specific luminance channels (i.e., LAB, LUV) and other parameters related to the visual perception of a pixel. This number may vary significantly according to specific application factors. In some embodiments, the number of levels may be determined with reference to the number of input bits and the number of output bits. In these embodiments, the number of levels may be determined by taking 2 to the power of the difference between the number of output bits and the number of input bits. In equation form this expression would be:

$$n=2^{(b_{in}-b_{out})}$$

For example, for an LCD display with the capability to display 6 bits, but receiving an input signal with 10 bits of data, the number of levels would be $n=2^{(10-6)}=2^4=16$.

When a display is linear, the dither values may be evenly distributed among each level. However, in many cases the display is not linear so the level distribution may be distributed in a non-linear manner. When the number of output bits is greater than 4 the non-linear effect is small so uniform distribution does not cause a large non-linear error. Accordingly, the number of pixel values may generally be distributed evenly among levels. However, for lower numbers of output bits and larger non-linearities (i.e., gamma>2) more threshold values should be distributed in the lower portion of the threshold range to compensate for the non-linear gamma effect.

Temporal Feedback

Negative feedback is used to push the temporal frequency of the dither pattern into high frequencies. In some embodiments, for frame 1, since it is the first frame with no other frames to reference, the temporal feedback function, fMask, relates to an initial reference frame (IRF). The initial reference frame may comprise essentially any noise pattern. An IRF may comprise pseudo-random noise, alternating patterns, a field of constant pixel values, a blank tile or frame or any number of other "patterns." In some embodiments, the IRF may be set to a uniform noise of amplitude 0.1.

For frame 2, frame 1 may be used as a feedback function. Frame 2 may also reference the IRF in some embodiments. For frame 3 and up, a temporal infinite impulse response (IIR) may be used in generating the feedback function, as shown in the following exemplary equation:

$$fMask = fMask * IIRCoef + (1 + IIRCoef) * frame(T-1) \ldots$$

The further away from the current frame, the less is the contribution to the feedback function.

For the last frame, since the dither pattern will repeat itself, in order to achieve a temporal high-pass relationship between the last frame and the first frame, the contribution of the first frame may be added to the temporal IIR filtering as:

$$fMask = fMask * IIRcoef + (1 - IIRcoef) * 0.5 * (frame(T-1) + frame(1))$$

While these particular embodiments have been found to perform well, many other methods may be used to disperse pixel values spatially and temporally.

Spatial Feedback

Figure 7:
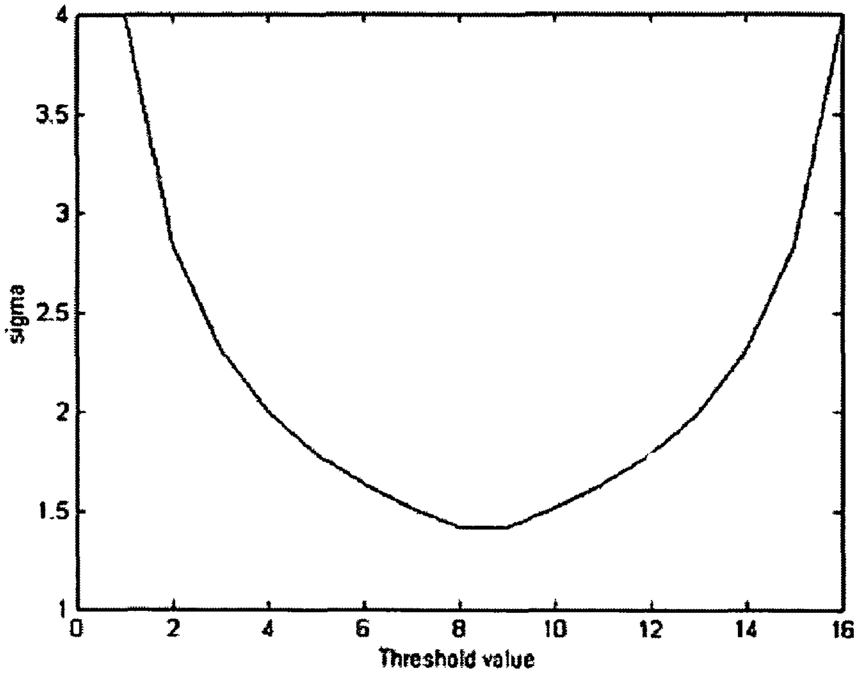
FIG. 7 illustrates the relationship between a sigma value and a dither value in some embodiments of the present invention.

The idea behind spatial noise distribution is trying to evenly distribute the dither values so that there is minimum fluctuation in both luminance and chrominance when viewed from a certain distance. In some embodiments, the first dither value or pixel of the first level is entirely dependent on the fMask function and the initial reference tile or frame, when an IRF is used. In some embodiments, it will take the position of the maximum value in the IRF. In other embodiments, where a multiple channel IRF is used, cross-channel feedback from the IRF may cause this position to vary. Subsequent pixels are generally placed as far away as possible to all the previous pixels. This is equivalent to placing charged balls in a plane. Each ball is trying to repel other balls of the same charge as far as possible. The new ball will end up in the least occupied space when all values are equal. The inverse distance-squared function may be used as a repellent function, which is equivalent to the repellent force between charges of the same type. The repellent function may be implemented with a convolution kernel as $$k(x, y) = 1 \Big/ \frac{x^2 + y^2}{\sigma^2} + 0.5$$

where x and y are the spatial coordinates, the constant 0.5 is used to prevent division by 0. It is also used to adjust cross color channel influence as described later. Sigma (σ) defines the spatial extent of the repellent function. It may be level dependent. For the first level, we have more degrees of freedom to which to assign dither values, thus the sigma may take a larger value. At the midlevel, near half of the cells are assigned and sigma may take a smaller value. FIG. 7 shows an exemplary relationship between sigma and the dither value level. This relationship works well in applications, however many other relationships including constant values may be used in embodiments of the present invention.

Figure 8:
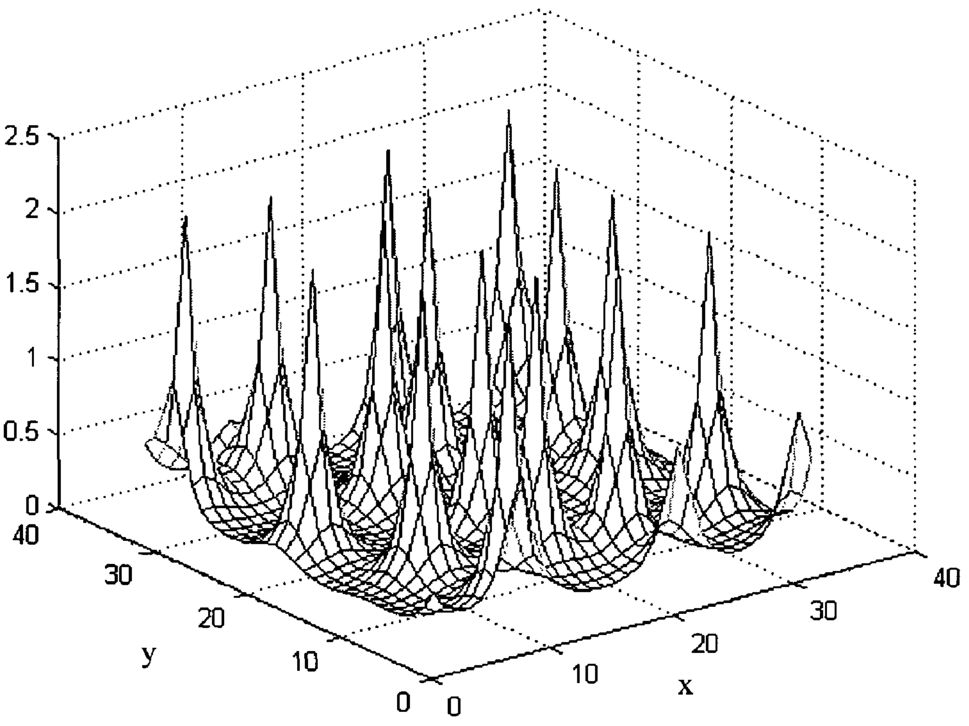
FIG. 8 illustrates an exemplary spatial feedback function of some embodiments of the present invention.

In some embodiments, the spatial feedback function may be referred to as the sMask function and may be expressed mathematically as $$sMask(x, y, color) = img(x, y, color) ** k(x, y)$$

where ** represents a convolution operation and img(x,y, color)=1 if a position is already assigned a dither value. To improve the speed, the convolution operation may be implemented in the frequency domain using Fourier transforms $$sMask(x, y, color) = F^{-1}\{F[img(x, y, color)] \bullet F[k(x, y)]\}$$

where F denotes a forward Fourier transform and $F^{-1}$ denotes an inverse Fourier transform. Whenever a new pixel is added, sMask may be recalculated to account for the presence of the new pixel value. FIG. 8 shows a typical spatial feedback function that may be used in embodiments of the present invention. In FIG. 8, the peaks 140 represent points where dither values have already been assigned.

Cross Color Channel Feedback

Since the luminance sensitivity of human vision is higher than chrominance sensitivity, it is important to optimize multiple color dither arrays so that the luminance fluctuation is minimized. As a non-limiting example, in an RGB image, for a given gray (luminance value), if the red dither value is assigned to a position, the green dither value should also be repelled by the red dither value. Cross channel feedback can be implemented using a set of weighted spatial feedback functions, which may be implemented as follows:

$$\begin{bmatrix} cMask_r \\ cMask_g \\ cMask_b \end{bmatrix} = \begin{bmatrix} C_{rr} & C_{gr} & C_{br} \\ C_{rb} & C_{gg} & C_{bg} \\ C_{rb} & C_{gb} & C_{bb} \end{bmatrix} \times \begin{bmatrix} sMask_r \\ sMask_g \\ sMask_b \end{bmatrix}$$

where $C_{ii}$ is the weight of one color feedback function to another color. Since the contribution to luminance is different for the three color channels, with green having the biggest contribution and blue the least, therefore, in some embodiments we can optimize the weight so that $C_{gg}$ is higher than $C_{bb}$. However, in many applications, this effect has been found to be small. Accordingly, in some embodiments, only two weights are implemented: off-diagonal weight C1 and diagonal weight C2. At mid levels, C1 is the smallest so that the cross channel feedback is very small. Various methods may be used to determine the best weighting values. Constant values may be used in some embodiments. These weights may also be determined using a level-dependent method. One embodiment of this is shown in the equations below.

$$C1 = ((level - nLevels/2)/nLevels)^{\wedge}2 + 0.07$$

$$C2 = 1 - 2 * C1$$

Combination of Temporal and Spatial Feedback Functions

The temporal feedback function, spatial feedback function and cross-channel feedback function may be combined to form a merit function for determining the position of a dither pattern value. The location of the minimum or maximum of this merit function may be assigned a new dither value (level). When the level is small, most of the space is unassigned and it is easier to find the few positions that are already assigned. However, when the level number is close to the last level, most of the space is occupied and it is easier to find the holes that are not assigned. Thus the generation process may be divided into two steps:

For level <=nLevels $$\text{mask}(x,y,\text{color})=1-f\text{Mask}(x,y,\text{color})+c\text{Mask}(x,y,\text{color})$$

$$\text{find}(x_0,y_0)|\text{mask}(x_0,y_0,\text{color})=\min(\text{mask}(x,y,\text{color}))$$

$$TA(x_0,y_0)=\text{level}-1$$

$$img(x_0,y_0)=1$$

Some exemplary embodiments of the present invention may be explained with reference to FIG. 9, which is a flow chart showing exemplary methods 100 for creation of a dither pattern tile set. In these embodiments a series of loop structures are used to perform repeated functions, however, alternative embodiments may use other recursive structures to implement these functions.

Initially, dither pattern tile set parameters 102 are designated to define the dimensions and characteristics of the tile set. Once the tile set is defined, each successive frame 104 is designated with reference to an initial reference frame and/or other image frames. In order to relate pixel values in a new dither pattern to other pixel values in preceding frames, an fMask function 106 is used. Depending on the position of the frame being designated, a different relationship or fMask function may be used as shown in the diagram 106, 108, 110 & 112.

In these particular embodiments, the first frame 106 will be designated with reference to an initial reference frame (IRF), which may be a random noise pattern or essentially any other pattern including a constant value tile or a blank tile. In some embodiments, the initial reference frame may simply be omitted and the first pixel value of the first frame may be placed by pseudo-random methods or other methods.

After the first frame of the dither pattern tile set has been established, the second frame may be established using an fMask function 108 that relates to the pixel values in the first frame. Subsequent frames may be established 110 with reference to one or more of the preceding frames and the IRF. The fMask function for the last frame 112 references the pixel values in the preceding frames as well as the first frame, which will be used in a cycle immediately following the last frame.

Once the fMask function for a particular frame is determined, a dither pattern tile is initialized 114 and the process for establishing the first level 116 of values is commenced. When cross-channel feedback methods employ level-dependent weighting factors, these factors may be calculated for the particular level 118.

In these exemplary embodiments, a loop is entered to designate the number of pixels that have been allocated to that particular level 120. Another loop is entered to cycle through the color channels 122. These structures are merely exemplary for some embodiments of the present invention and may be modified in many ways for alternative embodiments.

For each pixel value in a particular level within a particular color channel tile, the feedback functions are aggregated to find the location of a dither pattern pixel value 124. This operation may comprise spatial feedback, cross color-channel feedback and temporal feedback as well as other factors. Once a pixel value has been designated, the feedback values are recalculated using the new pixel value as additional input 126. Subsequent pixel values will be repelled from that newly designated value as well. In these illustrative embodiments, the next color tile is then selected 128 and a pixel value is designated in that tile. This second color pixel value is determined 130 according to the merit function taking into account the location of the first pixel value in the first color channel. This pixel designation process is repeated until all pixel values for a particular level have been designated for each of the color channels.

When a level is fully designated for all color tiles, the next level is selected 132 and pixel values for that level are designated for all color channels. When all levels have been designated for all color channels the next frame is selected 134. The process then repeats for the next frame by calculating the appropriate fMask 112 temporal feedback function, cross-channel feedback values 118 and spatial feedback factors 126 as well as other calculations. Once all frames are designated, the entire dither pattern array is stored for use in video processing 136.

Figure 9:
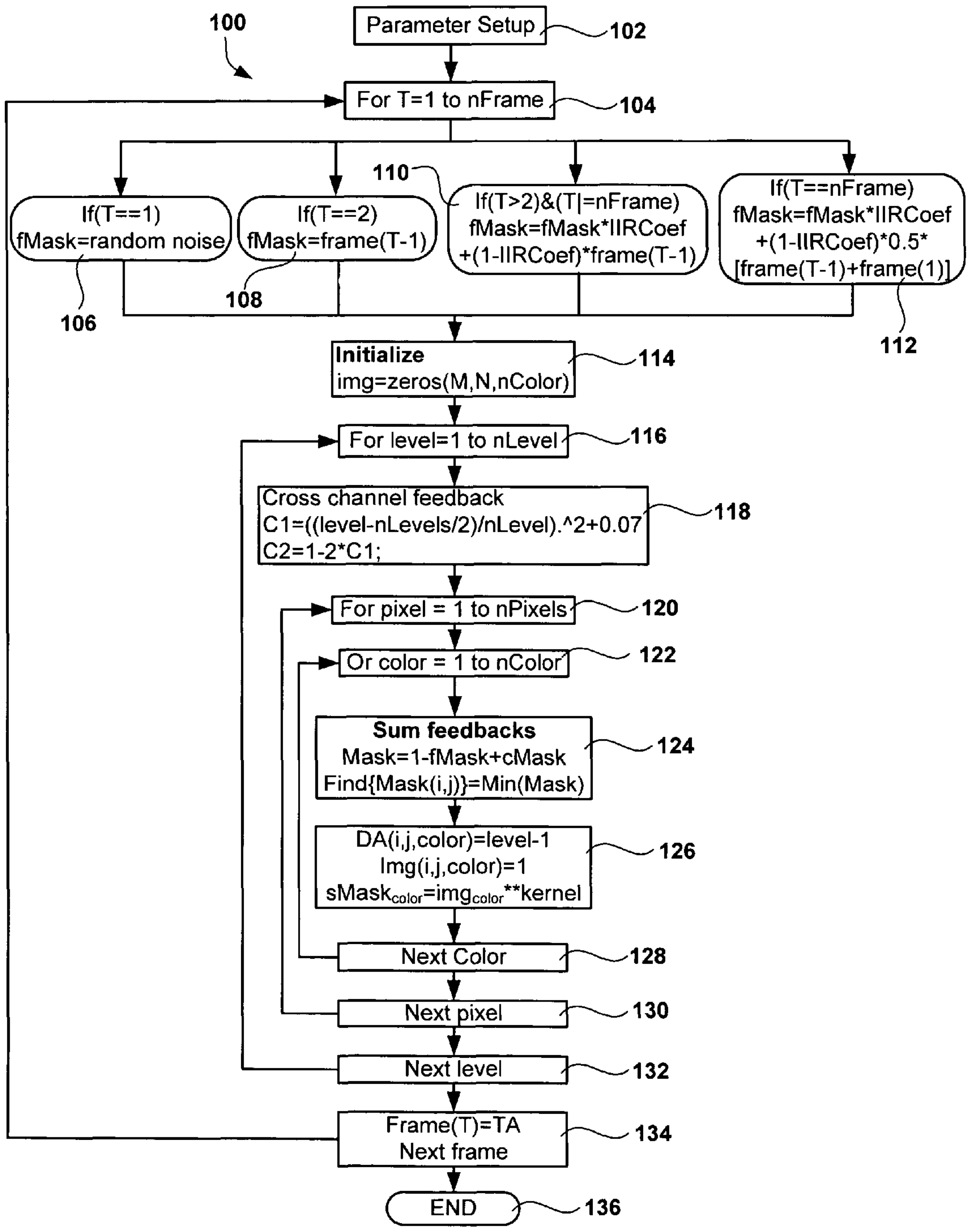
FIG. 9 is a block diagram illustrating exemplary methods for creating a dither pattern tile set.

It should be noted that in alternative embodiments, not illustrated in FIG. 9, dither pattern pixel values may be designated in other orders. As a non-limiting example, the pixel distribution loop 130 may reside within the color channel selection loop 128 causing all pixels values for one level of a color channel to be designated before proceeding to the next color channel. As another non-limiting example, the level selection loop 132 may reside within the color selection loop 128. In effect, this alternative will cause a pixel value from each level to be placed in a color channel tile before proceeding to the next color channel. Many other variations in these processes may also be implemented by one skilled in the art based on the information described herein.

Figure 10:
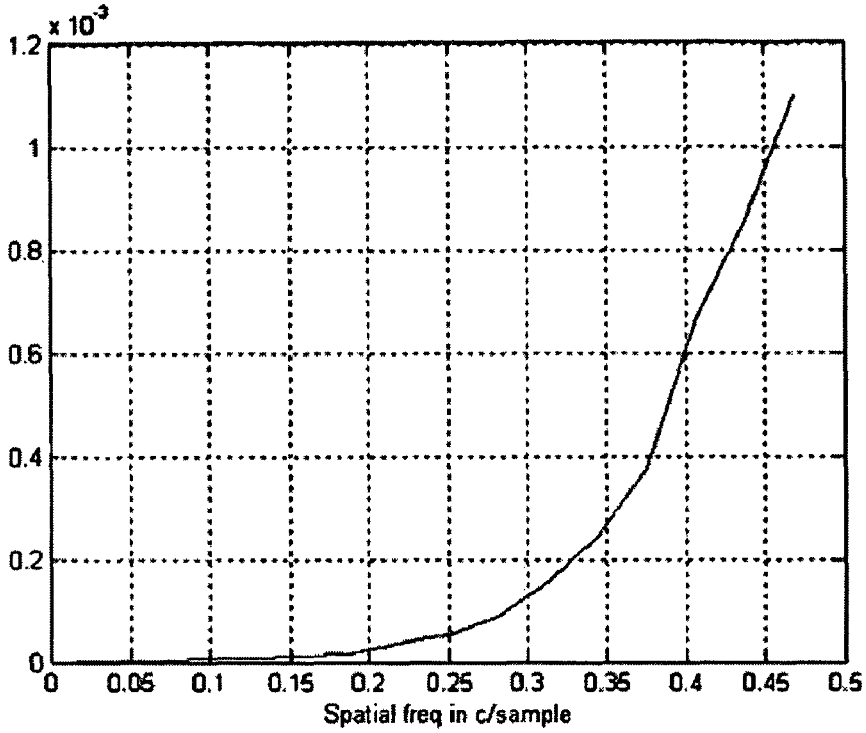
FIG. 10 illustrates a radial frequency spectrum of a dither array of some embodiments of the present invention.
Figure 11:
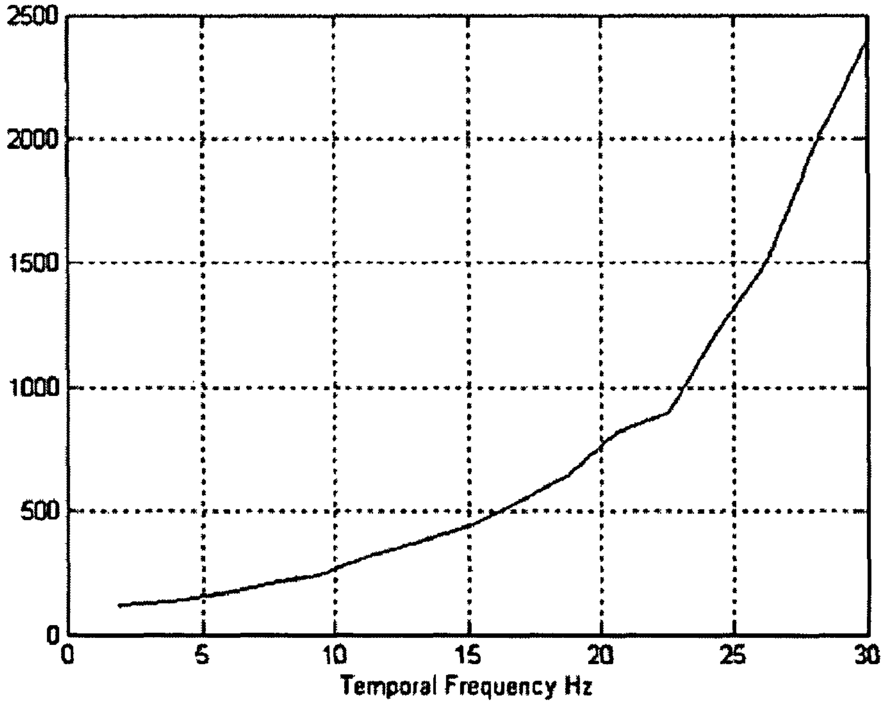
FIG. 11 illustrates a temporal frequency spectrum of a dither array of some embodiments of the present invention.

To determine the frequency characteristics of dither pattern arrays produced with embodiments of the present invention a Fourier analysis may be used. FIG. 10 shows a graph of the radial frequency spectrum of one frame of an exemplary dither array. This demonstrates the spatial high-pass characteristics of a dither pattern. FIG. 11 shows the temporal frequency spectrum of a dither array and demonstrates the temporal high-pass frequency characteristics of the array.

Figure 1:
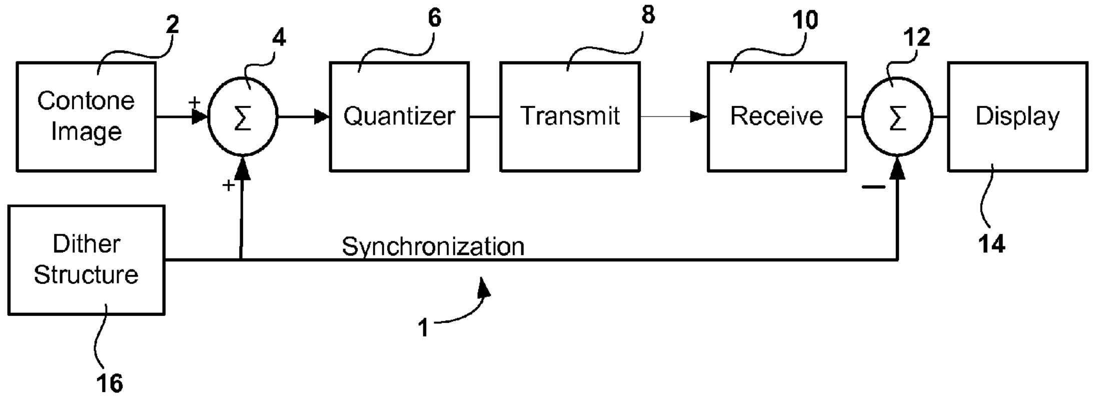
(Prior Art) Figure 1
FIG. 1 illustrates an image display system.
Figure 2:
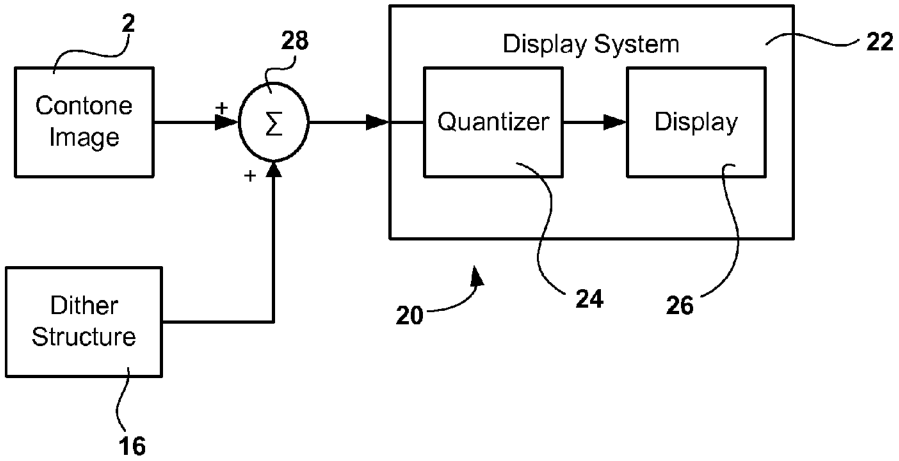
(Prior Art) Figure 2
FIG. 2 illustrates another image display system.
Figure 3:
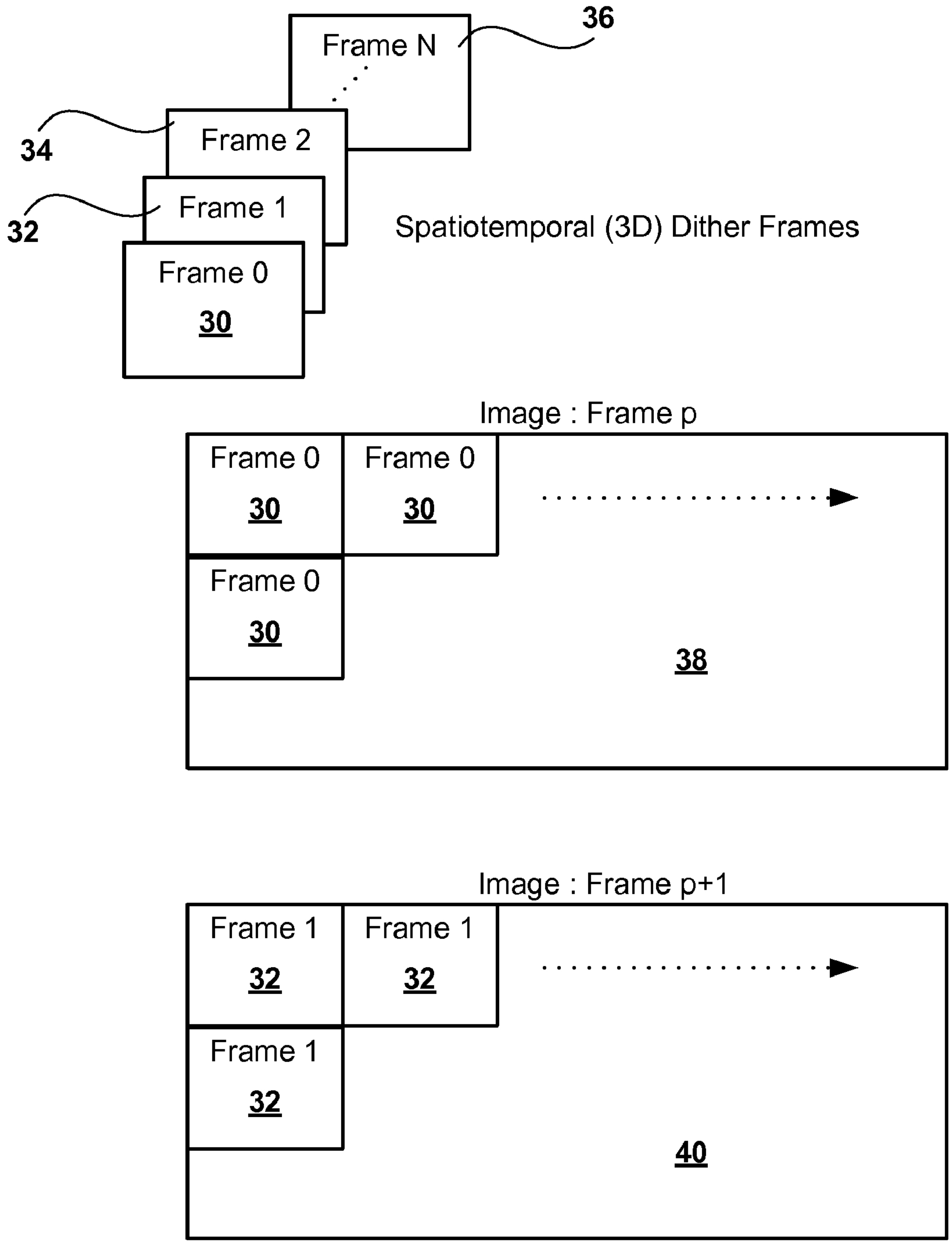
(Prior Art) Figure 3
FIG. 3 illustrates a three-dimensional dither structure.
Figure 12:
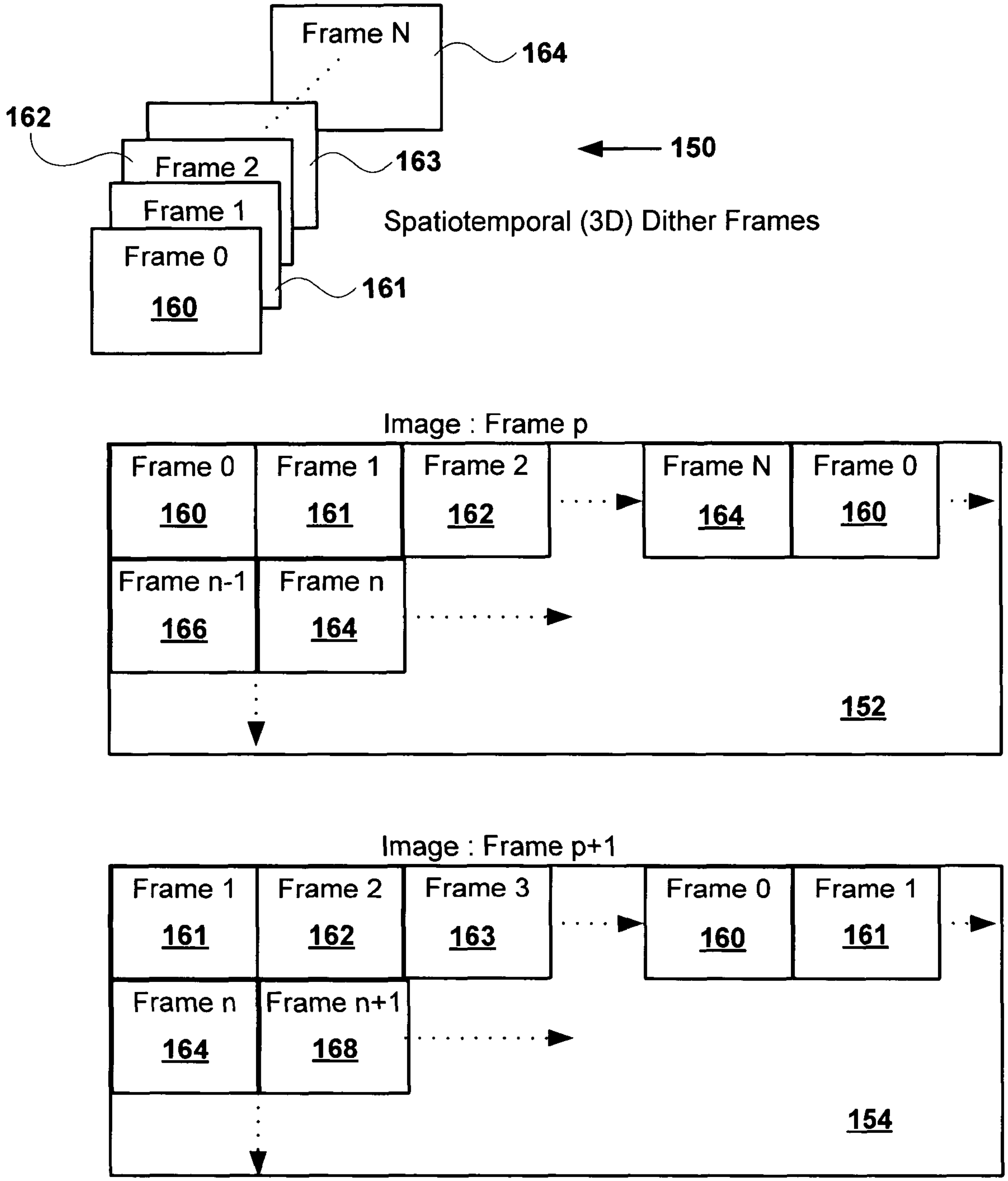
FIG. 12 illustrates a use of a dither pattern tile set wherein dither pattern tiles are arranged in a specific sequence.

Some embodiments of the present invention may also employ a tile stepping method as illustrated in FIG. 12 for further reduction of the possibility of visible artifacts. In these embodiments, a spatio-temporal array of dither pattern tiles 150 may be used. These dither pattern tiles 150 are typically smaller than the image to which they are applied in order to reduce memory size. The smaller tiles can cover the image in a tile pattern that uses the same tiles repeatedly. In some applications, the same tile is used repeatedly across the image as shown in FIG. 3. However, this method can result in visible artifacts caused by the repeated pattern. This problem may be reduced or eliminated by using tiles from multiple successive frames This method can be employed in the spatial and temporal dimensions. As shown in FIG. 12, tiles can be incremented spatially across an image 152 starting with a first tile frame 160 and then using each successive tile frame 161, 162 & 164 to fill out the tile pattern across the image 152. This pattern of successive tile frames can be employed in the temporal direction as well. In the next successive image frame 154, the tile frame succeeding the tile frame used in the prior image frame at any given tile location is used. For example, when a first tile frame 160 is used in the top left position in a first image frame 152, the next successive tile frame 161 is used at that location in the next image frame 154. Similarly, the second tile position in the first frame 152 is occupied by the second tile frame 161 and that position in the second image frame 154 is occupied by the third tile frame 162. The same pattern is repeated for each tile position and each image frame. Once the number of tile frames is exhausted, the tile set order is repeated.

Figure 13:
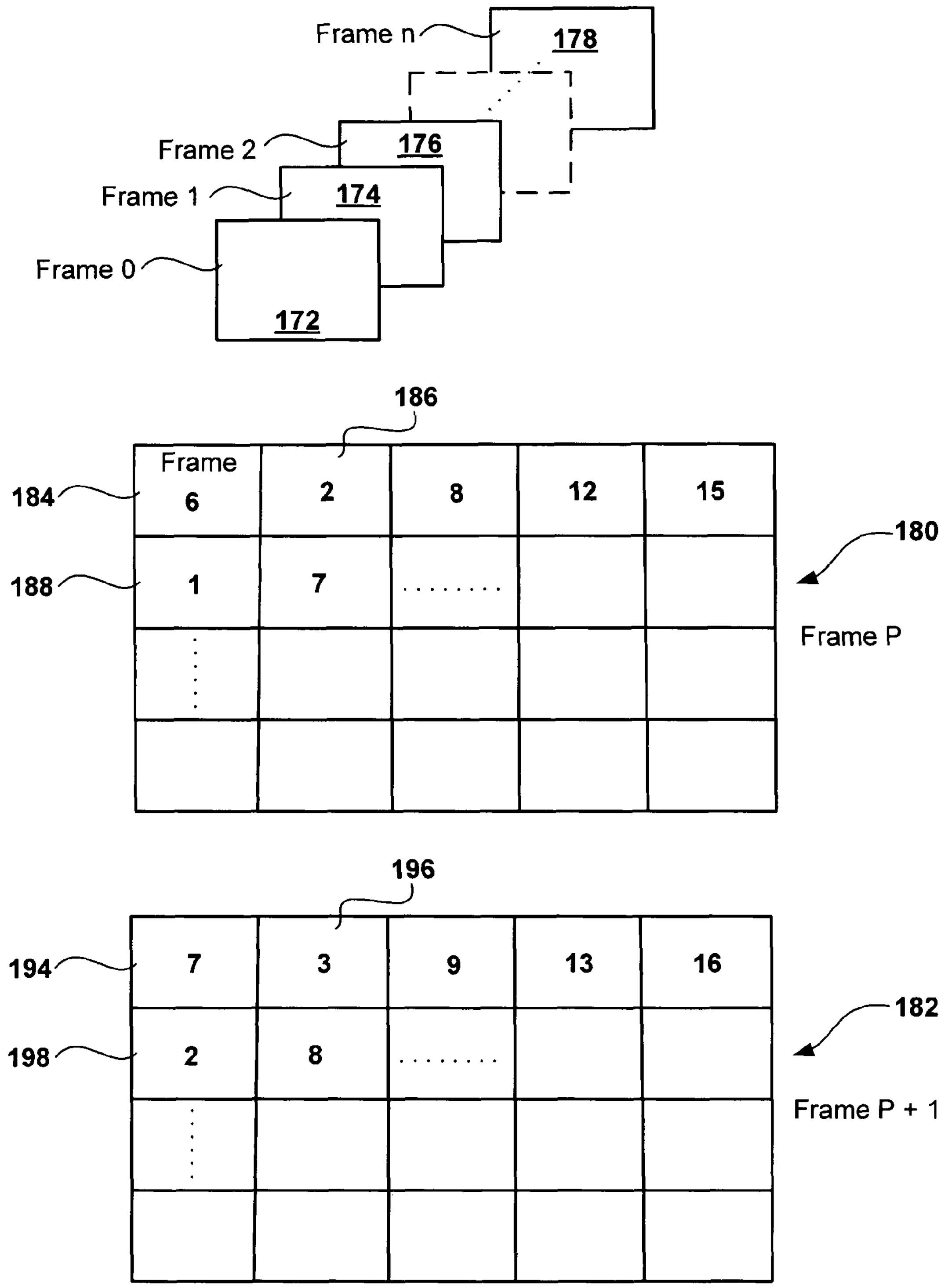
FIG. 13 illustrates another use of a dither pattern tile set wherein tiles are put in a random spatial pattern, but used sequentially in the temporal dimension.

In other embodiments of the present invention, the tile pattern in a particular frame may be varied beyond a sequential spatial order across the rows. In some embodiments, the tiles may be dispersed in a random spatial order across a frame. Once this random spatial pattern is established in the first frame, the tiles in the next temporal frame and subsequent frames will follow a sequential temporal order such that the tile corresponding to the position of a tile in the first frame will be the next sequential tile in the temporal order established in the dither tile structure. These embodiments are illustrated in FIG. 13 where a dither tile set 170 is established with tile frames 0 through 3 (172-178) shown in sequential temporal order. Tile set 170 will typically comprise many other frames as well, but the quantity illustrated is limited to 4 for simplicity of explanation. In a first image frame 180, tiles 172-178 and other tiles in a set are dispersed randomly across the frame 180. In the next image frame, p+1 (182), the tile used at any particular location is the next tile in temporal order from the tile used at that location in the previous frame. For example, at the top left tile location 184 in frame “p” 180, dither tile 6 is used as randomly placed. For the tile at that location 194 in frame “p+1” 182, the next tile in temporal order established in the dither tile structure 170, frame 7, is used. Likewise, for the second tile in the first row 186 of frame “p” 180, tile 2 is used and the next tile, tile 3 is used for that location 196 in frame “p+1” 182. Of course, other non-random and pseudo-random patterns may be employed as well.

Some embodiments of the present invention may make use of the oblique effect of the human visual system. The contrast sensitivity function of the human visual system is dependent on the viewing orientation. Vertical and horizontal sensitivity are higher than diagonal angles such as 45 degrees. To take advantage of this effect, the dither pattern may be designed to have its power spectra peak at 45 degrees. The convolution kernel of embodiments of the present invention can take advantage of this property. Instead of using Euclidian distance, we can use city block distance in the repellent function as shown in the equation below:

$$k(x, y) = 1 \Big/ \frac{(|x| + |y|)^2}{\sigma^2} + 0.5$$

In some embodiments of the present invention, level dependent temporal feedback functions may be used such that only a small fraction of fMask is applied to the combined feedback function at mid levels. As a non-limiting example, a normalized C1 can be used in the spatial feedback function as a weighting function for fMask as well.

The terms and expressions employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

We claim:

1. A method for creating a spatio-temporal array of dither patterns, said method comprising:

a. establishing a spatio-temporal array of dither pattern tiles;

b. establishing a first temporal frameset in said spatio-temporal array;

c. establishing a first dither pattern tile in a first color channel of said first temporal frameset and a second dither pattern tile in a second color channel of said first temporal frameset;

d. initializing said dither pattern tiles with one or more initial pixel values;

e. designating first pixel values in said first dither pattern tile using a cross-channel repellent function;

f. wherein locations of said first pixel values are spatially repelled relative to locations of other pixel values in said first dither pattern tile;

g. wherein the locations of said first pixel values are spatially repelled relative to locations of second pixel values in said second dither pattern tile in said second color channel; and h. wherein said designating is performed by a computing device comprising a processor and a memory.

2. A method according to claim 1 wherein said temporal array also comprises a second temporal frameset comprising third pixel values and the locations of said first pixel values are also spatially repelled relative to the locations of said third pixel values in said second temporal frameset.

3. A method according to claim 2 wherein said repellent function effect relative to the locations of said third pixel values in said second temporal frameset is weighted wherein temporal frames more temporally distant from said first pixel values have a lesser repellent effect than less-temporally-distant temporal frames.

4. A method according to claim 1 wherein said repellent function effect relative to the locations of said second pixel values in said second color channel is weighted wherein said second pixel values in said second color channel have a lower repellent effect than said first pixel values in said first color channel.

5. A method according to claim 2 further comprising additional temporal framesets and a last temporal frameset wherein pixel values designated in said last temporal frameset are considered temporally adjacent to said first temporal frameset wherein said first pixel values in said first temporal frameset have a spatial repellent effect on pixels designated in said last temporal frameset.

6. A method for creating a spatio-temporal array of dither patterns, said method comprising:

a. establishing an initial temporal offset frameset (ITOF), wherein said ITOF comprises a pre-determined pattern for each of a plurality of color channels;

b. establishing a first temporal frameset comprising dither pattern tiles for each of a plurality of color channels;

c. designating a first pixel value at a first point in a first dither pattern tile of said first temporal frameset, wherein said first point is dispersed from at least one pixel value in said pre-determined pattern, wherein said designating is performed by a computing device comprising a processor and a memory;

d. designating a second pixel value at a second point in said first dither pattern tile of said first temporal frameset, wherein said second point is placed at a location that is dispersed away from at least one pixel value in said first dither pattern tile, wherein said designating is performed by said computing device;

e. repeating step d until all pixel values in said first dither pattern tile of said first temporal frameset have been designated;
f. designating a first pixel value at a first point in a second dither pattern tile of said first temporal frame, wherein said first point is dispersed from at least one pixel value in said first dither pattern tile;
g. designating a second pixel value at a second point in said second dither pattern tile of said first temporal frameset, wherein said second point is placed at a location that is dispersed away from at least one other pixel value in said first dither pattern tile;
h. repeating step g until all pixel values in said second dither pattern tile have been designated;
i. repeating steps f, g & h until all pixels in all dither pattern tiles in said first temporal frameset have been designated;
j. establishing a subsequent temporal frameset comprising dither pattern tiles for each of said plurality of color channels;
k. designating a first pixel value at a first point in a first dither pattern tile of said subsequent temporal frameset, wherein said first point is dispersed from at least one pixel value in said first temporal frameset;
l. designating a second pixel value at a second point in said first dither pattern tile of said subsequent temporal frameset, wherein said second point is placed at a location that is dispersed away from at least one pixel value in said subsequent temporal frameset, at least one pixel value in at least one prior frameset;
m. repeating step l until all pixel values in said first dither pattern tile of said subsequent temporal frameset have been designated;
n. designating a first pixel value at a first point in a second dither pattern tile of said subsequent temporal frame, wherein said first point is dispersed from at least one pixel value in said subsequent temporal frameset, at least one pixel value in a prior frameset;
o. designating a second pixel value at a second point in said second dither pattern tile of said subsequent temporal frameset, wherein said second point is placed at a location that is dispersed away from at least one pixel value in said subsequent temporal frameset, at least one pixel value in a prior temporal frameset;
p. repeating step o until all pixel values in said second dither pattern tile have been designated;
q. repeating steps n, o & p until all pixels in all dither pattern tiles in said subsequent temporal frameset have been designated;
r. repeating steps j-q for a plurality of framesets.

7. A system for creating a spatio-temporal array of dither patterns, said system comprising:
a. a spatio-temporal array of dither pattern tiles;
b. said spatio-temporal array comprising a first temporal frameset;
c. said first temporal frameset comprising a first dither pattern tile in a first color channel and a second dither pattern tile in a second color channel;
d. an initializer for initializing said dither pattern tiles with one or more initial pixel values;
e. a designator for designating first pixel values in said first dither pattern tile using a cross-channel repellent function;
f. wherein locations of said first pixel values are spatially repelled relative to locations of other pixel values in said first dither pattern tile;
g. wherein the locations of said first pixel values are spatially repelled relative to locations of second pixel values in said second dither pattern tile in said second color channel; and
h. wherein said designator comprises a processor and a memory.

8. A computer-readable, non-transitory storage medium comprising computer-executable instructions encoded in a computer program for creating a spatio-temporal array of dither patterns, said instructions comprising:
a. establishing a spatio-temporal array of dither pattern tiles;
b. establishing a first temporal frameset in said spatio-temporal array;
c. establishing a first dither pattern tile in a first color channel of said first temporal frameset and a second dither pattern tile in a second color channel of said first temporal frameset;
d. initializing said dither pattern tiles with one or more initial pixel values;
e. designating first pixel values in said first dither pattern tile using a cross-channel repellent function;
f. wherein locations of said first pixel values are spatially repelled relative to locations of other pixel values in said first dither pattern tile;
g. wherein the locations of said first pixel values are spatially repelled relative to locations of second pixel values in said second dither pattern tile in said second color channel; and
h. wherein said designating is performed by a computing device comprising a processor and a memory.

9. A method for applying a spatio-temporal array of dither pattern tiles stored on a computer-readable, non-transitory storage medium, said medium comprising instructions for:
establishing a spatio-temporal array of dither pattern tiles, said establishing comprising representing a plurality of temporal framesets in said spatio-temporal array, each of said framesets comprising a plurality of dither pattern tiles for each of a plurality of color channels;
wherein pixel values in said dither pattern tiles are designated using a cross-color-channel repellent function such that locations of pixel values, in a first dither pattern tile in a first of said color channels, are spatially repelled relative to the locations of other pixel values in said first dither pattern tile and wherein the locations of said pixel values in said first dither pattern tile are also repelled relative to the locations of pixel values in dither pattern tiles in another of said color channels; and
applying said dither pattern tiles to a digital image using a computing device comprising a processor in communication with said medium.

10. A method for creating a spatio-temporal array of dither patterns, said method comprising:
establishing a first temporal frameset comprising dither pattern tiles for each of a plurality of color channels;
initializing said dither pattern tiles with one or more initial pixel values;
designating a first pixel value at a first point in a first dither pattern tile of a first color channel of said first temporal frameset, wherein said designating is performed by a computing device comprising a processor and a memory;
designating a second pixel value at a second location in a second dither pattern tile of a second color channel of said first temporal frameset using a cross-color-channel repellent function, wherein said second location is repelled away from the location of at least one pixel value in said first dither pattern tile, wherein said designating is performed by said computing device; and repeating step b and c until all pixel values for a given level in said first dither pattern tile and said second dither pattern tile of said first temporal frameset have been designated.

11. A method for creating a spatio-temporal array of dither patterns, said method comprising:

establishing a first temporal frameset and a second temporal frameset, wherein said framesets comprise dither pattern tiles for each of a first and a second color channel;

initializing said dither pattern tiles with one or more initial pixel values;

designating pixel values at locations in a first dither pattern tile of a first color channel of said first temporal frameset using a cross-color-channel repellent function, wherein said locations are repelled relative to locations of other pixel values in said first and second color channels in said first temporal frameset and said second temporal frameset, wherein said designating is performed by a computing device comprising a processor and a memory;

designating pixel values at locations in a second dither pattern tile of a second color channel of said first temporal frameset, wherein said locations are spatially repelled relative to locations of other pixel values in said first and second color channels in said first temporal frameset and said second temporal frameset, wherein said designating is performed by said computing device.

* * * * *